July 27, 1965     H. J. LUNDBERG     3,196,922

INNER-TIRE SAFETY AND SPARE TIRE

Filed April 14, 1964

INVENTOR.
*Herbert John Lundberg*
BY

*ATTORNEY*

United States Patent Office 3,196,922
Patented July 27, 1965

3,196,922
INNER-TIRE SAFETY AND SPARE TIRE
Herbert John Lundberg, 175 Van Nostrand Ave.,
Jersey City, N.J.
Filed Apr. 14, 1964, Ser. No. 360,179
8 Claims. (Cl. 152—340)

This invention is a new type within-the-tire spare tire. It gives the driver of any vehicle using pneumatic tires the ability to keep control of his vehicle in the event of a "blow-out" or "flat." It also enables the driver, without stopping to change tires, to continue to drive to a service station for repairs, allowing much greater distances in pursuit of same as this inner spare tire refills the tire to its original size as opposed to the present already inflated inner spare tires which have to be smaller than the tire they are within.

Figure 1:
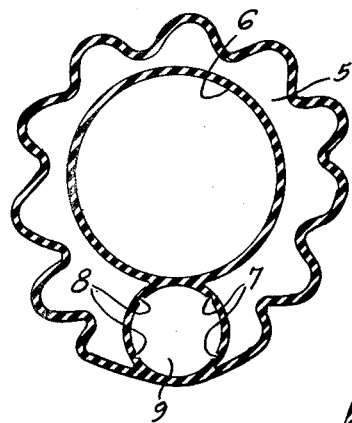
Figure 2:
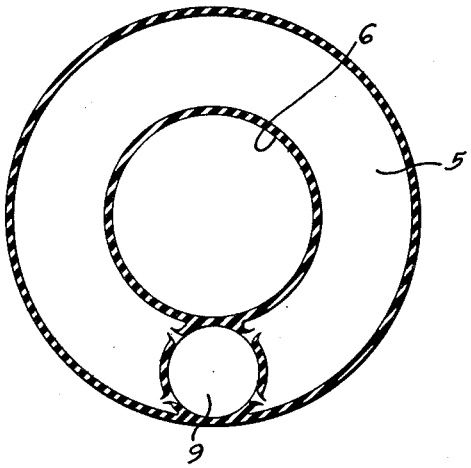
Figure 3:
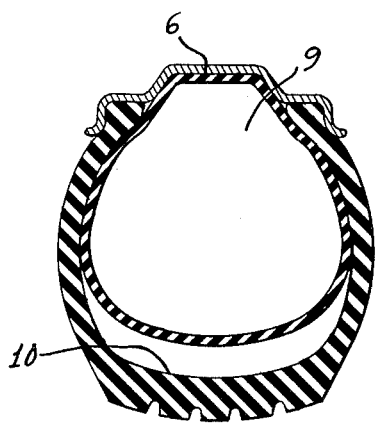

This new inner-spare tire can be made of synthetic rubber, but natural rubber may be used also. In its basic form it consists of a normally air-inflated rubber "ball" with a normally non-inflated collapsed rubber tube (or as referred to in this application, inner-tire) attached at two places to the ball. Where the inner- tire joins the ball there is enclosed in the wall of the ball a valve or weak spot. What is meant here is that the wall of the ball at the spot which is enclosed by the inner tire joining the ball will be of lesser thickness than the ball itself, and this weak spot will have a breaking tolerance from pressure just slightly above the pressure from the compressed air contained in the ball. The ball itself will be of a thickness to withstand great pressure, the inner-tire also will be of much heavier gauge rubber to withstand much more pressure than the "weak spots." As in the case of tubeless tires, this new inner-tire will be placed around the wheel rim so as to fit inside the outer tire. Reference is now made to the accompanying drawings wherein:

FIGURE 1 is a schematic transverse sectional view of the normally non-inflated collapsed rubber tube attached at its two opposite ends to the normally air-inflated rubber ball reservoir and extending about the wheel rim, in accordance with this invention;

FIGURE 2 is a schematic transverse sectional view of the rubber tube in its normally air-inflated state, subsequent a blow out and attached at its two opposite ends to the rubber ball air reservoir with its weak wall spots ruptured, the tube including the ruptured wall ball extending about the wheel rim; and FIGURE 3 is a schematic transverse sectional view of the inner tire-spare tire of this invention.

Referring to FIGURE 1, rubber tube or inner tire 5 is normally in non-inflated, collapsed condition extending about wheel rim 6, and it is inflated when weak spots 7 and 8 in the wall of ball 9 break due to pressure excerted on ball 9 due to outer tire failure. FIGURE 2 shows inner-tire 5 inflated, with ball 9 still retaining air and thus acting as part of inner-tire. With reference to FIGURE 3, ball 9 is shown inflated between the walls of inflated tire 10 with typically 1 inch allowance between the bottom of ball 9 and the wall of inflated outer tire 10. The ball will contain sufficient compressed air within to inflate tire to its normal size, the amount of air contained depends on size of tire. The ball will be so constructed as to fit comfortably within the outer tire walls and be typically one inch from the wall of the outer tire 10. This typical one inch space between bottom of ball and bottom wall of outer tire will allow for normal "bumps and grinds" a tire encounters on the road, it also allows for small losses of air which happen occasionally and are of no real consequence. However, if this outer tire should encounter a blow-out while moving, the slightest pressure on this ball beyond the one inch allowance point will break open the two valves or "weak spots" in the wall of the ball and instantly the compressed air within will fill the inner-tire, so that no matter what speed the outer tire may be traveling at, by the time it will have made maximum one revolution beyond point of blow-out, there will be a new inflated inner-tire within the blown outer tire. This instant release of the compressed air into the inner tire is possible because the valves or weak spots 7 and 8 will be of a thickness with a breaking point just slightly above that of the pressure of the compressed air in the ball. This also applies in the case of "flats," and if the flat occurs while the vehicle is standing one has but to move the vehicle until pressure is put on the ball in the tire, and inner-tire will inflat. The aforementioned installation applies to tubeless tires, in dealing with tires with tubes, the invention would have to be installed in the tire tube by the tube manufacturer.

What is claimed is:

1. A pneumatic tire comprising a tire mounted on a wheel rim, the tire being normally air-inflated when in use on a vehicle wheel, a rubber tube disposed intermediate the rim and the tire and extending about the rim, the rubber tube being normally in a non-inflated, collapsed condition and attached at at least two places to a normally air-inflated rubber envelope reservoir, and the envelope reservoir containing sufficient compressed air therewithin to inflate the tube and hence retain the normal, in use air-inflated condition of the tire, the rubber envelope reservoir having at least one weak wall portion of relatively small area and of lesser thickness than the remainder of the wall thereof, said weak wall portion being enclosed by the tube attached to the envelope reservoir and adapted to break and allow passage of air from the envelope reservoir into the tube thereby to inflate the tube substantially immediately after application of a pressure to the envelope reservoir above the pressure of the compressed air within the reservoir.

2. A pneumatic tire comprising a tire mounted on a wheel rim, the tire being normally air-inflated when in use on a vehicle wheel, a rubber tube disposed intermediate the rim and the tire and extending about the rim, the rubber tube being normally in a non-inflated, collapsed condition and attached at its two opposite end portions to a normally air-inflated rubber envelope reservoir, and the envelope reservoir containing sufficient compressed air therewithin to inflate the tube and hence retain the normal in use air-inflated condition of the tire, the rubber envelope reservoir having two spaced apart weak wall portions of relatively small area and of lesser thickness than the remainder of the wall thereof, said weak wall portions being enclosed by the tube attached to the envelope reservoir and adapted to break and allow passage of air from the envelope reservoir to the tube thereby to inflate the tube substantially immediately after application of a pressure to the envelope reservoir above the pressure of the compressed air within the reservoir.

3. In a land vehicle equipped with wheels including tires mounted on the wheel rims, the tires being normally air-inflated when in use on the vehicle wheels, the improvement comprising a rubber tube disposed intermediate each wheel rim and the corresponding tire and extending about the rim, the rubber tube being normally in a non-inflated collapsed condition and attached at its two opposite ends to a normally air-inflated rubber envelope reservoir, and the envelope reservoir containing sufficient compressed air therewithin to inflate the tube and hence retain the normal in use air-inflated condition of the tire, the rubber envelope reservoir having two spaced apart weak wall portions of relatively small area and of lesser thickness than the remainder of the wall thereof, said weak wall portions being enclosed by the tube attached to the envelope reservoir and adapted to break and allow passage of air from the envelope reservoir to the tube thereby to inflate the tube substantially immediately after application of a pressure to the envelope reservoir above the pressure of the compressed air within the reservoir.

4. The combination of claim 3 wherein the rubber of the tube and of the compressed air envelope reservoir is natural rubber.

5. The combination of claim 3 wherein the rubber of the tube and of the compressed air envelope reservoir is synthetic rubber.

6. The combination of claim 3 wherein, exclusive of the normally non-inflated tube attached to the envelope compressed air reservoir, the tire is a tubeless tire.

7. The combination of claim 3 wherein the envelope compressed air reservoir is in the form of a hollow ball with an inner air chamber defined by the spherical wall thereof.

8. The combination of claim 7 wherein the wall of the ball compressed air reservoir is narrowly spaced apart from the tire wall.

References Cited by the Examiner
UNITED STATES PATENTS

| | | | |
|---|---|---|---|
| 742,831 | 11/03 | Brunt et al. | 152—340 |
| 2,118,165 | 5/38 | Christopher et al. | |
| 2,452,783 | 11/48 | Nebesar. | |

ARTHUR L. LA POINT, *Primary Examiner.*